US009535823B2

(12) United States Patent
Peretz et al.

(10) Patent No.: US 9,535,823 B2
(45) Date of Patent: Jan. 3, 2017

(54) METHOD AND APPARATUS FOR DETECTING SOFTWARE BUGS

(75) Inventors: Doron Peretz, Pardesia (IL); Eli Shalom, Petach-Tikva (IL)

(73) Assignee: TYPEMOCK LTD., Tel Aviv (IL)

( * ) Notice: Subject to any disclaimer, the term of this patent is extended or adjusted under 35 U.S.C. 154(b) by 369 days.

(21) Appl. No.: 13/366,411

(22) Filed: Feb. 6, 2012

(65) Prior Publication Data

US 2012/0222014 A1    Aug. 30, 2012

Related U.S. Application Data

(60) Provisional application No. 61/447,431, filed on Feb. 28, 2011.

(51) Int. Cl.
*G06F 11/36*    (2006.01)

(52) U.S. Cl.
CPC ....... *G06F 11/3684* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 5,758,062 A * | 5/1998 | McMahon et al. | | 714/38.11 |
| 5,761,408 A * | 6/1998 | Kolawa et al. | | 714/38.1 |
| 5,892,947 A * | 4/1999 | DeLong et al. | | 717/100 |
| 6,895,578 B1 * | 5/2005 | Kolawa et al. | | 717/130 |
| 8,627,296 B1 * | 1/2014 | Picard | | 717/135 |
| 2004/0098707 A1 * | 5/2004 | Tang | | G06F 11/3624 717/130 |
| 2005/0273757 A1 * | 12/2005 | Anderson | | G06F 11/3636 717/100 |
| 2007/0168973 A1 * | 7/2007 | Crihfield | | 717/124 |
| 2007/0277158 A1 * | 11/2007 | Li et al. | | 717/135 |
| 2010/0058300 A1 * | 3/2010 | Zeng et al. | | 717/131 |

OTHER PUBLICATIONS

Artzi et al., "Recrash: Making software failures reproducible by preserving object states." European Conference on Object-Oriented Programming. Springer Berlin Heidelberg, Jul. 2008.*
Saff et al., "Mock object creation for test factoring."Proceedings of the 5th ACM SIGPLAN-SIGSOFT workshop on Program analysis for software tools and engineering. ACM, Jun. 2004.*

* cited by examiner

*Primary Examiner* — Chameli Das
*Assistant Examiner* — Joanne Macasiano
(74) *Attorney, Agent, or Firm* — Vladimir Sherman; Professional Patent Solutions

(57) ABSTRACT

A computer-implemented method and apparatus for unit testing, the method comprising: intercepting user interactions when a user is testing a function implemented by user code; recording execution data for the function execution; generating one or more tests based on the execution data, wherein each test is generated in accordance with a heuristic applicable for the function; detecting a code change in the function; and automatically executing the tests function to test the user code as changed.

14 Claims, 3 Drawing Sheets

METHOD AND APPARATUS FOR DETECTING SOFTWARE BUGS

CROSS REFERENCE

The present application claims the benefit of U.S. Provisional Patent Application 61/447,431, filed Feb. 28, 2011, the disclosure of which is incorporated herein by reference.

TECHNICAL FIELD

The present disclosure relates to software development in general, and to unit testing, in particular.

BACKGROUND

Testing and quality control is a crucial part of software development, and should be done throughout all stages of the software development lifecycle. A software developer should test all the code he or she programmed for proper and exception-free operation, as well as ensuring that the code provided the expected results.

Defects, also known as bugs, may be introduced to a piece of software at any development phase, including for example during initial programming, at a later time when existing code is changed for adding new functionalities or for fixing other bugs, or further later when changing other pieces of code which influence or are influenced by the current code. Thus, in many cases bugs are introduced into a piece of code which was already tested and approved, but changes in that piece of code or in other parts caused the bug. Of course, the later a bug is discovered, the harder it is to localize it so it can be fixed, and the more expensive and resource consuming it is to fix it. Currently, it is hard to identify a new bug in code which has already been known to work properly.

Unit testing is a concept according to which individual units of source code are tested to determine if they are fit for use. A unit is a part of an application that can be tested independently of other parts. For example, in procedural programming a unit may be an individual function or procedure, while in object-oriented programming a unit may relate to a method or to a class having one or more methods.

The benefits of unit testing, which relate to bug isolation, version management and others, are recognized industry-wide, but many software developers do not perform proper unit testing, because of the added burden and time constraints. Instead, some employ very partial testing during development and rely on tests performed on integration stages, in which additional units are involved. In other cases, developers sometimes perform manual unit testing where they create a temporary program to test their new code and then throw the temporary program away, thus delaying the problem to the next development phase. Automated unit testing, however, is currently hard to implement and its implementation and usage requires a lot of discipline on the user's side.

A major disadvantage of this course of action is that even if a unit has been thoroughly and successfully tested, regression testing is still missing; it is not guaranteed, and indeed is rare, that the tests will be run again or that future versions will remain bug-free. In many cases a developer modifying code in one part of the product introduces bugs into other parts which already work, and these bugs can go unnoticed because the working unit will not be re-tested. This leads to many bugs being discovered at later quality assurance stages at which stage it may hold back other programmers, or even at customer sites, which incurs much higher costs, delayed deadlines and wasted resources.

For example, the cost of fixing a bug during coding is estimated in $25, during unit testing $100, in function testing it is estimated in $250, on system testing it is estimated in $1000, and after releasing the software it increases to as high as $16,000.

There is thus a need for a unit testing method and apparatus for enabling early bug identification during software development.

BRIEF SUMMARY

The present invention includes methods, systems and apparatus for unit testing of application code and executable code for performing same. According to some embodiments, there is provided a software development environment for facilitating development of application code, which environment may be functionally associated with a test generation module and a test execution module. The generating and execution modules may be discrete or integrated with one another. As part of code development according to some embodiments, execution of one or more functions/methods (hereinafter "functions", unless specifically referred to as methods) of the application code from within the development environment may be intercepted and/or recorded, for example by a Runtime Interception Component ("RIC"). Data related to the execution may be used to generate and/or update a secondary call stack which may be referred to as a shadow call stack. Generally, each point in the execution of a function or executable can be described as a stack trace, i.e., a sequence of calls optionally with attached parameters. An execution of a program, a function, or part thereof may therefore be described as a tree, wherein each route from a node to the root represents a stack trace associated with the execution of one function or method. The output of the RIC, which may relate to functions or executables executed by one or more threads may thus be represented as one or more such trees, generally referenced as shadow call stack.

The shadow call stack may be used to generate testing code, including code for: preparing arguments for function calls, preparing a call to the function, and preparing an assertion for the function result or side effect.

At least a portion of the testing code is based on a rule engine or heuristics, wherein it is asserted whether a given function or set of functions, intercepted and/or read from the shadow call stack, complies with one or more conditions. Corresponding rules are used for generating the code for at least one condition or heuristic the function complies with.

According to further embodiments, the coverage of the application code by the generated tests may be displayed.

According to further embodiments, application code changes made in the environment to code that was related to any of the tests, may be detected, for example by detecting a textual change in a function or compilation of any function. The code changes may trigger execution of the testing code generated according to any of the embodiments of the present invention. Results of the code testing, and/or the coverage of the application code by the generated tests, may be provided by a dedicated user interface, for example over the application code as displayed by the software development environment.

A first aspect of the disclosure relates to a computer-implemented method for unit testing performed by a computerized device, comprising: intercepting user interactions when a user is testing a function implemented by user code; recording execution data for the function execution; generating one or more tests based on the execution data, wherein the tests are generated in accordance with at least one heuristic applicable for the function; detecting a code change in the function; and automatically executing one or more of the test functions to test the user code as changed. Within the computer-implemented method, the execution data may optionally comprise one or more call stacks recorded during the function execution. The computer-implemented method may further comprise determining whether the code change requires testing. The computer-implemented method may further comprise: starting a debug session; executing one or more of the test functions within the debug session; and stopping execution at the user code. Within the computer-implemented method, one or more of the heuristics may be selected from the group consisting of: the function returns a primitive type; the function has a return value of a non-primitive type and the return value is later used by a function that returns a primitive value; the function under test is a member of an object for which another method which returns a primitive value, is called; and a non-primitive argument to the function is interacted from within the function. Within the computer-implemented method two or more heuristics may optionally be checked for applicability at a descending priority order, and one or more test functions may be generated in accordance with a first applicable heuristic. Within the computer-implemented method generating code for a test optionally comprises: determining that a heuristic is applicable for the function; preparing setup for the function; preparing a call to the function; and preparing an assertion for the at least one test. Within the computer-implemented method, generating code for one or more tests may comprise isolating testing of a second function called from within the function. Within the computer-implemented method, generating code for the test may optionally comprise validating that the test passes for the user code as created. The computer-implemented method may further comprise selecting the test function for execution from a multiplicity of tests.

A second aspect of the disclosure relates to an apparatus for unit testing, comprising: an integrated development environment (IDE) communication component for providing unit testing capabilities as an add-in to an IDE used for developing user code; a runtime interception component for intercepting user interactions when a user is testing a function implemented by user code, and recording execution data; a test generation component for generating code for one or more tests based on the execution data, wherein one or more of the tests is generated in accordance with one or more heuristics applicable for the function; and a test execution component for automatically executing the test function to test the user code when changed. Within the apparatus the execution data may optionally comprise one or more call stacks recorded during execution of the function. Within the apparatus, the heuristic may be selected from the group consisting of: the function returns a primitive type; the function has a return value of a non-primitive type and the return value is later used by a function that returns a primitive value; the function under test is a member of an object for which another method which returns a primitive value, is called; and a non-primitive argument to the function is interacted from within the function. Within the apparatus, the test execution component may comprise a test selection component for selecting one or more selected tests to be performed, and a runtime test execution component for executing the selected tests. The apparatus may further comprise a user interface component for displaying data to a user and receiving information from a user.

A third aspect of the disclosure relates to a computer program product comprising: a non-transitory computer readable medium; a first program instruction for intercepting user execution of a function implemented in user code; a second program instruction for recording execution data for the function execution; a third program instruction for generating one or more tests based on the execution data, wherein the tests are generated in accordance with one or more heuristics applicable for the function; a fourth program instruction for detecting a code change in the function; and a fifth program instruction for automatically executing the at least one test function to test the user code as changed, wherein said first, second, third, fourth and fifth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figures 1A, 1B:
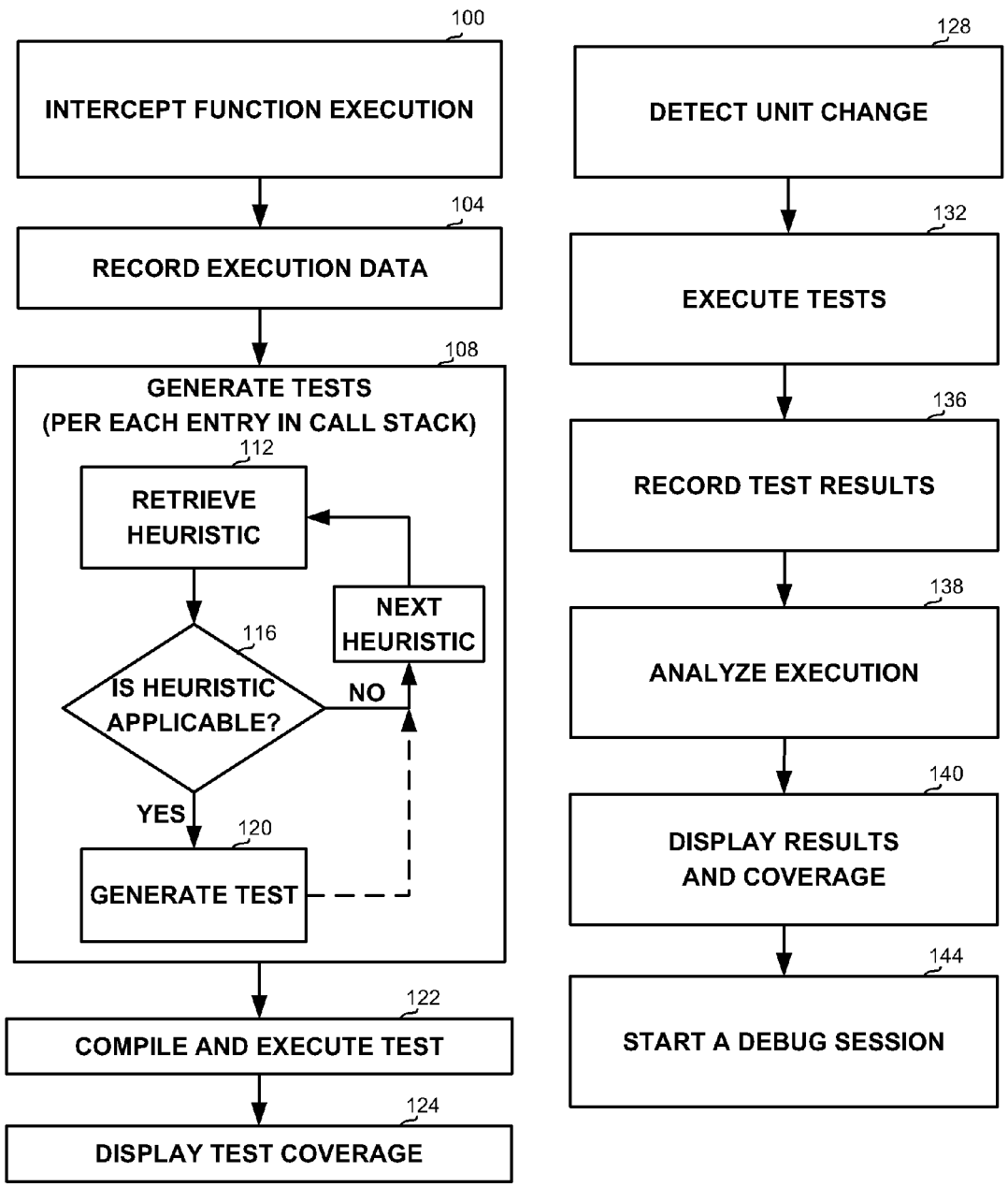
FIG. 1A shows a flowchart diagram of steps in a method for generating tests for unit testing, in accordance with some exemplary embodiments of the disclosed subject matter.
FIG. 1B shows a flowchart diagram of steps in a method for unit testing, in accordance with some exemplary embodiments of the disclosed subject matter.

In accordance with some embodiments of the disclosed subject matter, there is thus provided an apparatus and method for code test automation, which may be embedded within and integrated with a development environment, and ensures ongoing unit testing, including regression testing.

The present invention includes methods, systems and apparatus for unit testing of application code and executable code for performing same. According to some embodiments, there is provided a software development environment for facilitating development of application code, which environment may be functionally associated with a test generation module and a test execution module. The generating and execution modules may be discrete or integrated with one another. As part of code development according to some embodiments, execution of one or more functions/methods (hereinafter "functions", unless specifically referred to as methods) of the application code from within the development environment may be intercepted and/or recorded, for example by a Runtime Interception Component ("RIC"). Data related to the execution may be used to generate and/or update a data structure which may be referred to as a shadow call stack. Generally, each point in the execution of a function or executable can be described as a stack trace, i.e., a sequence of calls optionally with attached parameters. An execution of a program, a function, or part thereof may therefore be described as a tree, wherein each route from a node to the root represents a stack trace associated with the execution of one function or method. The output of the RIC, which may relate to functions or executables executed by one or more threads may thus be represented as one or more such trees, generally referenced as shadow call stack.

The shadow call stack may be used to generate testing code, including code for: preparing arguments for function calls, preparing a call to the function, and preparing an assertion for the function result or side effect.

At least a portion of the testing code is based on a rule engine or heuristics, wherein it is asserted whether a given function or set of functions, intercepted and/or read from the shadow call stack, complies with one or more conditions. Corresponding rules are used for generating the code for at least one condition or heuristic the function complies with.

According to further embodiments, the coverage of the application code by the generated tests may be displayed. Displaying coverage provides feedback to the user about what parts of their code are protected and provides the opportunity to test and protect those parts that are not.

According to further embodiments, application code changes made in the environment to code that was related to any of the tests, may be detected, for example by detecting a compilation of any function, or a textual change in a function, for example by monitoring keyboard input for code changes in the development environment. The code changes may trigger execution of the testing code generated according to any of the embodiments of the present invention. Results of the code testing, and/or the coverage of the application code by the generated tests, may be provided by a dedicated user interface, for example over the application code as displayed by the software development environment.

One technical problem dealt with by the disclosed method and apparatus is the difficulty to validate in an ongoing manner that a software unit that has been tested and validated to operate properly, remains functional when the code of the unit changes. A piece of code may change in order to add features, to fix bugs or to change some behavior, whether in the piece of code itself or in other parts of the program. Another reason for changing is the need for refactoring code for maintenance purposes, which is often avoided in systems in which unit testing is not performed, since it is difficult to determine if a code change broke existing functionality.

Introducing changes to a piece of code thus requires the activation of regression tests to assure that existing functionality was not harmed. The code should be re-tested whenever changes are introduced which affect its functionality, in order to detect bugs as soon as they are introduced to the code rather than at a later stage. The method and apparatus should not require the programmer to program specific testing code, or to manually activate testing, which many programmers will simply not do. The method and apparatus should clearly present which parts of the code are covered by tests and which are not.

One technical solution comprises a unit testing tool which may be embedded within a software development environment, for example as an addin. The tool enables software developers to automatically test their code in an ongoing manner, based on tests they have already performed once, with minimal user intervention.

In accordance with some exemplary embodiments, the method and apparatus identify when a user manually tests a piece of code within a code unit, such as a function or a method, wherein a code unit may refer for example to a class implementing one or more methods. Testing the code may be identified by tracking the runtime environment such as the Common Language Runtime (CLR) for Microsoft's .NET framework. Whenever the testing environment identifies that the CLR is about to execute the unit, for example by the development environment indicating that a process is about to begin, the unit testing method and apparatus keep track of the call stack information throughout the execution. Tests are then generated based on the call stack information. Some of the test generation process may be performed during the initial test execution, while other parts may be performed after execution is completed, when all the required information has been gathered.

One or more tests may be generated for each function call in any of the call stacks recorded during the execution. For each such function call, one or more heuristics may be examined for applicability to the node, and corresponding tests may be generated for one or more of the applicable heuristics. In some embodiments, the heuristics are examined in descending priority order, and a test is generated in accordance with the first heuristic that applies, i.e., with the heuristic having the highest priority. In other embodiments, a test can be generated for each heuristic that applies, in which case all heuristics have to be checked, even if one or more have been found to be applicable.

The heuristics can relate to whether the function returns a primitive value, to whether the function returns a non-primitive value which is later called, or the like, as detailed below.

In some embodiments, a test is compiled and executed immediately after it has been created. Thus, if a test does not compile successfully it is eliminated from being added to the test collection. Also, unless otherwise indicated by a user, a test is assumed to have passed. Thus, if a different result or side effect is encountered when the test is executed immediately after it has been created, it is assumed to be invalid and removed from the collection as well.

In some embodiments, the method and apparatus may provide for isolating between tests. For example, if function M1 calls function M2, then if M1 is tightly related to M2, such that there is no point in isolating M2 from M1, only the test as recorded from the manual test is added to the collection. Otherwise, separate tests may be suggested, even if the user did not perform any. In this case, the user may receive a notification stating, for example, that M2 has not been tested outside the context of M1 and it may be recommended to perform further tests thereon.

The method and apparatus add the tests to a collection relevant to the unit. Once the unit has changed, for example after code has been modified, compiled and the unit has been built successfully, some or all of the tests associated with the unit may be executed, optionally in the background. However, it will be appreciated that tests can be collected, compiled or executed per one or more methods and not necessarily per unit.

Each function or method that has been executed during a manual test by a user and for which a matching heuristic was found, is therefore associated with one or more scenarios or tests, wherein each such test is associated with a collection of input variables and faked dependencies of other units, such as a unit providing database services to the tested unit. The unit is thus isolated of any external dependency, so that only the unit under test is indeed tested.

The method and apparatus thus use information related to testing as performed and approved by a programmer, for creating a test collection, wherein the tests in the test collection may then be run as regression tests once the code changes.

The method and apparatus may provide a user with online notifications about areas of the code not covered by any test, and about tests that did not pass for the code as it currently stands. The method and apparatus may also provide the user with graphic representation of the covered and non-covered parts of the code, and of the status of the tests in relation to the latest changes to the code. In some embodiments, when a test failed, the system may provide information regarding the expected result or side effect vs. the actual result or side effect, and may let the user reconstruct the failing scenario without having to manually rerun the test.

One technical effect of utilizing the disclosed subject matter is the provisioning of ongoing unit testing based on actual tests initiated once by the user. On one hand, the tests do not imitate the user's activities like the "black box" approach taken by some manual testers or by some systems, and on the other hand the system is not tested as a whole using the "system test" approach suggested by other systems. Rather, the disclosed method and apparatus test specific functions or methods, and are independent of external units. This approach enables the identification of the origin of a newly encountered bug, i.e., what code change caused the bug. In addition, the disclosed method and apparatus are more robust in that they recognize that not every change necessitates retesting the whole system, but rather identify the areas that do need retesting.

Another technical effect of the disclosed subject matter relates to its efficiency: by integrating the apparatus into a development environment and executing the tests in an ongoing manner, the user receives immediate feedback, such that the he is notified of new bugs soon after their creation, when it is still easy to fix them since not much of functionality is based on the bug. In addition, the testing does not require the developer to write excess testing code, or to execute the tests in a separate environment.

Referring now to FIG. 1A, showing a flowchart diagram of steps in a method for generating tests for unit testing.

On function execution interception step 100, the user's activity in testing the application is intercepted. The interception can be triggered, for example, by the Integrated Development Environment (IDE) indicating that a process is about to start. Another trigger for interception can be tracking of all processes and selecting the processes that contain user code.

On step 104, the execution data is recorded throughout the execution. In some embodiments, the method intercepts function calls made in runtime by registering to receive notifications for entry or exit of any function. This can be done, for example, in Microsoft .NET environment by using a Common Language Runtime (CLR) Profiler, and registering to receive MethodEnter or MethodLeave notifications. Information received by these notifications is then used to create a shadow call stack, i.e., an in-memory call stack representing the actual call stack as executed by the tested application.

For each execution, a shadow call stack may be recorded. In some embodiments, as the shadow call stacks are used for test generation and for performance analysis, only function calls that may require test generation are logged. For example, function calls between $3^{rd}$ party components are filtered out as these are not made from within user code and should not be tested.

In some embodiments, for each function call logged within a shadow call stack, the function's metadata is probed using the interception information. The following data may be logged for purposes of test generation: function name; function signature, including return type and argument types; arguments values; actual return value; generic arguments (class' or method's), reflection metadata such as visibility or accessibility, modifiers (such as static, virtual, etc.), IsSpecialName, a sequential identifier for the calling instance; whether the method belongs to the user code or to $3^{rd}$ party code; or any other information.

In some embodiments, each shadow call stack is represented as a collection of trees, and the processes spawned by each thread make a collection of such collections.

In some embodiments, the data is serialized, for example into an XML string to be used in the test generation process detailed below.

On test generation steps 108, one or more tests are generated upon each node of the tree representing the collected shadow call stack information. The tree nodes may be traversed, for example, in DFS order, BFS order, or any other order, and each node in the tree, which represents a specific state during the execution is analyzed. Some of the generation, such as eliminating cases that cannot or should not be tested may be performed while the test execution is still ongoing. Other parts of the test generation, for example parts that use the return value of a method or function may only be performed when execution is completed.

Each such node is tested according to one or more heuristics. Each heuristic comprises an applicability test, and a test generation algorithm if it is applicable. Thus the node is checked in accordance with the heuristic to determine whether the heuristic is applicable to the node. Optionally, the heuristics are ordered by descending priorities, so that the first heuristic that is applicable to the code is selected, a test is generated upon that heuristic and other heuristics are not checked. In other embodiments, the node is examined against all heuristics, and a test is generated upon any heuristic applicable to the node.

Thus, on step 112 a heuristic is retrieved from a heuristic collection. If the heuristics are ordered in accordance with some priority measure, the heuristics are retrieved according to the priority.

On step 116 it is determined whether the retrieved heuristic is applicable to the node, and if so a test is generated upon the node on test generation step 120, in accordance with the heuristic. In those embodiments in which the heuristics are associated with priorities, then if the heuristic is applicable and a test is generated, the step ends and may be repeated for the next node in the tree. In other embodiments in which multiple tests can be generated, further heuristics may be examined, and further tests may be generated in accordance with the applicable heuristics.

Heuristic applicability testing step 116 and test generation step 120 are further detailed in association with FIG. 2 below.

On optional step 122 the test code as generated on steps 108 and possibly additional code statements, are compiled and executed. Compiling the tests is useful in verifying that the tests compile properly. Executing may relate to validating that the test provides the same behavior as the actual execution intercepted on step 100. If this is the case, the test can be declared as "passed" for that version of the tested unit upon which it was created. Thus, the test is run immediately after it was generated. If the test passes, it is added to the test collection, while if the test does not compile, or raises an exception or the test assertion fails, the test is not added to the test collection, and an error code may be returned.

On optional step 124, the coverage achieved by the generated tests is displayed. In order to intercept code segments that were tested during a unit test execution, the system can use the code weaving technique, as described for example in "Rewrite MSIL Code on the Fly with the .NET Framework Profiling API" by Aleksandr Mikunov published on MSDN Magazine September 2003, incorporated herein by reference in its entirety.

Using this technique, code is injected which raises a Boolean flag into every code block, i.e., a contiguous execution segment of code, in the unit under test. Using debug information, the code block and flag can be tied to a location in a source code file. When test execution is performed, whether during the manual tests performed by the user or later during automatic testing, the Boolean flags relating to the covered code blocks are trapped, and when test execution is complete the system analyzes the different flags and creates coverage information. The information may contain a list of covered files and locations, and the test that generated the coverage. This information may be displayed to a user, for example, in a graphic manner by coloring user code statements that have been accessed by at least one test with a different color than code lines that have not been tested by the executions performed by the user until that time or by the tests performed during the automatic testing. Alternatively, the coverage information describing execution of tests can be displayed textually, for example, as follows:

C:\source\project\core\core.cs: line 4: col 1-line 4: col 20:TestA; C:\source\project\core\core.cs:line 6:col 1: line 4:col 12:TestB.

Referring now to FIG. 1B, showing a flowchart diagram of steps in a method for unit testing.

On step 128, code changes are detected. For efficiency, step 128 may be implemented to detect code changes only after the code has been saved, compiled and built successfully, or after no user input has been received for a predetermined amount of time, otherwise more changes can be expected to be introduced to the code. Code changes may be tracked in the IDE, by intersecting the code changes with the existing coverage information. The coverage information relates to blocks, wherein each block is associated with a part of, or full one or more code statements. When a statement is changed, the relevant code block and related tests become invalid. Using this method, each code change affects only the tests that go through the code. Identifying code changes as a trigger for running the tests, provides for identifying bugs at an early stage, when they are still relatively easy to fix. Detecting code changes may also facilitate presentation, e.g., showing a user which methods cannot be considered to be tested, and choosing tests to be executed after the next compilation.

Once it is detected that a newly built version is available, on step 132 one or more of the tests generated on steps 108 are executed. In order to determine which tests should be executed, optimization may be performed, so that a minimal set of unit tests is performed for testing the changes introduced to the code. The test selection may be performed, for example, by crossing information about changes performed by the user, with past coverage data. Thus, the tests to be performed include all tests that generated past coverage information for any block that has been changed.

The tests are executed using the test code as generated and compiled on step 108, the compiled unit to be tested, and the names of the tests to be executed. The test code can be analyzed using techniques such as reflection, parsing or RTTI.

The tests may be executed as follows: all test functions in the test code are scanned. If the test functions are implemented as methods of objects, then the tests may be traversed according to the objects they belong to. In addition, each such object or function may comprise additional functions which are not test functions but rather auxiliary functions. The auxiliary functions are not called. Each test function is compared against the list of tests as generated by the optimization described above. If the test appears on the list, then it is executed. If an error is returned by the test, or an exception is raised, the error is logged, and a fail code is returned. The tests may be compared against the selected tests using string comparison of the test names generated as described for example in association with step 104 of FIG. 1 above.

On step 136 the tests' results are recorded, and on step 138 the test results are analyzed. Optionally, analysis step 138 may be performed during recording step 136. Optionally, analysis comprises starting and profiler and analyzing the code coverage as demonstrated by the execution results.

On step 140 the test results may be displayed to a user. The results may be displayed in any required manner, such as textual, as a table, graphically on the user's code wherein functions or methods for which the test passed and failed are colored in different colors, and yet another color is used for non-tested areas.

On optional step 144, a debug session is started, execution of the generated test is reconstructed so that the test is executed, and execution stops at the beginning of the relevant code area for which the test fails, from which the user can continue debugging. This provides a user with immediate access to a faulty scenario which he can debug, thus making debugging faster and more efficient. In some embodiments, whether to start a debug session or not may be determined according to the user preferences, which may be a general setting, or suggested to the user per case. In some further embodiments, step 144 can be performed or suggested only if one or more of the tests have failed Referring now to FIG. 2, showing a flowchart diagram of steps in a method for determining whether a heuristic is applicable, and generating a test associated with an applicable heuristic and a particular node in the shadow call stack. The implementation of steps of FIG. 2 as detailed below, depends on specific heuristics used. Some exemplary heuristics are disclosed as follows:

1. Primitive return value test generation, which may be used if the function under test, i.e., the node of the tree which is currently being tested returns a primitive type, such as an integer, float, character, string, or the like. For example, in a student-teacher-school management application, if there is a function that returns a student's average grade, this heuristic applies for this function.

2. Non-primitive return value state test generation, which may be used if the function under test, i.e., the node of the tree which is currently being tested returns a non-primitive type, such as an instance of a class, a record, a structure, or the like, and later on after the function has returned, the return value is referred to by a function that returns a primitive value. In the example above, such function can be a method that receives a new subject and grade for a student and returns an object containing all the subjects the student took and the corresponding grades. If the returned object is later used by a function that returns a primitive value, such as a function that calculates the student's average grade, then this heuristic applies.

3. Object under test state test generation, which may be used if the method under test is a member of an object which is later used, for example another method of the object, which returns a primitive value, is called. This heuristic tries to assess whether future calls of method for the same object return correct values, i.e. whether the object may seem to be correct. In the above example, this may relate to a situation in which the tested method is a member of a student object, and receives a new subject and grade for a student. If another method of the student object, which returns a primitive value, is later called, such as a method of the student object that calculates the student's average grade, then this heuristic applies.

4. Argument interaction test generation, which may be applicable if any of the non-primitive function arguments is later on interacted with. In the above example, this heuristic may apply wherein the tested method receives a student object, a new subject and a grade, and later on calls a method of the student object, such as a method for adding the new grade.

It will be appreciated that the disclosed heuristics are ordered such that a lower numbered heuristic provides more direct indication for the correctness of the tested function.

It will also be appreciated that different, more, less or any other combination of heuristics can be designed and implemented.

The steps below use the following annotation: a call to method or function M is represented by node X in a particular shadow call stack.

On step 116, it is determined whether a specific heuristic is applicable to node X. The implementation of step 116 may vary in accordance with the specific heuristic.

For the heuristic that relates to a primitive return value method, then if method M return-type is primitive, such as an integer, a float, a character, a string, or the like, then the heuristic is applicable and a value of true is returned, otherwise false is returned.

For the heuristic that relates to a non-primitive return value method, then the following algorithm may be used: if node X's return type is primitive, then false is returned; otherwise interactions taking place with the returned (non-primitive) value, for example method calls that receive the returned value as argument, are iterated at their occurrence order. If at least one such interaction is detected which returns a primitive value before a mutator method (a mutator method is any method which may change the state of the object) is called on the object, the heuristic is applicable and a value of true is returned; otherwise, if no such interaction which returns a primitive value is found, false is returned.

For the heuristic that relates to an object under test state, interactions taking place with the object under test, for example method calls for the particular object, are iterated at their occurrence order. If at least one such call is detected which returns a primitive value before a mutator method is called on the object, the heuristic is applicable and a value of true is returned; otherwise, if no such future method call for the particular object exists, which returns a primitive value is found, false is returned.

For the heuristic that relates to an argument interaction test generation, if the method does not receive any non-primitive argument, then the heuristic is non-applicable. Otherwise, if the method body contains interactions with the any of the non-primitive value, then the heuristic is applicable, otherwise it is not.

Test generation step 120 generates test code, and then compiles and checks it.

On substep 200 of test generation step 120, code statements are generated which prepare for calling the function or method. The setup may comprise three main substeps: setup generation substep 204, isolation substep 208, and test choosing substep 212.

For detailing setup generation substep 204, the following definitions may be used:

A frame: a frame may be defined as a representation of a function or method call, including the function or method parameters, the return value, and the context, or the location in the call tree—which method or function called the relevant method or function. The frame may be graphically represented as a node in a call tree.

A dependency frame: a frame representing a method call done from a frame. The method call can be made directly or indirectly from within a method call.

A dependency: an entity associated with a dependency frame. For example, a parameter, a type, a field, etc.

A primitive dependency: a value type injected into the frame. A value can be injected as a parameter to the frame or, for instance methods, to the constructor frame.

A class dependency: a non-value instance injected into the frame.

An instantiated dependency: a non-value type instantiated by the frame or by the constructor frame.

Static frame dependency: a static method called from a frame.

Static dependency: the static type on which a static method is called.

Unit state: a state associated with any object or type in object oriented languages. The state is usually internal and can be changed using the object or type methods. The state may be constructed by the fields and references of the object or type.

Mutating method: a method acting on an object or type and changing its unit state.

Setup: Calls made on the unit under test before the call to the method under test in order to simulate the unit state being tested. Setup can be empty if unit state does not influence the test. Setup is an ordered list of frames.

Setup generation substep 204 can be performed using unit states and compositions:

Unit state setup generation may be done as follows: denote the method under test M, and denote the intercepted frame of M as $f_M$. If $f_M$ uses the unit state (for example by accessing its fields), then the setup should contain the preceding method calls on the unit under test, in order to recreate the state. In this case, the setup frames will be chosen by intersecting the state used in the frame under test and the state mutated by preceding frames. The setup using the unit state may be denoted $S_{US}$.

Composition setup generation: the longest length of composed setup may be defined as n, wherein n is a configurable constant by which setup sets are chosen. Let $S_{C_i}$ be a setup which contains the last i frames preceding the frame under test. The composition set of the setups is $\{S_{C_i}|0 \leq i \leq n\}$.

The output of setup generation substep 204 comprises the composition setups and the unit state setup $S=\{S_{C_i}|0\leq i\leq n\}\cup\{S_{US}\}$, which makes a total of n+2 possible setups.

Isolation substep 208 may be performed as follows:

Denote by n a configurable constant which represents the maximum depth of dependencies being searched.

For every possible setup generated by setup generation substep 204, all dependencies for setup frames, frames under test, and construction frames, if relevant, which have depth of up to n levels, are searched. The result is for every setup s in S, a set of dependencies D. Since there may be n+2 sets, there may be n+2 dependency sets.

Then object model based isolation and composition based isolation may be performed.

Object model based isolation may be performed as follows:

For every primitive dependency, the intercepted value may be used. For any other dependency. If the dependency is in the object model, then the real dependency may be used, and constructed with its real dependencies up to n levels, and any deeper dependency may be faked. If the dependency is not in the object model, then a fake of the dependency is used. Object model determination is described further below.

Denote by m a configurable constant which represents the maximum number of real dependencies allowed.

Composition based isolation may be performed as follows:

For every primitive dependency, the intercepted value may be used. If the number of non-primitive dependencies is greater than m, then all dependencies are faked. Otherwise, all combinations of fakes and real are generated for all dependencies. An exception may be that if a dependency is injected through a parameter whose declared type is interface only, then fake may be used.

The results of the object model based isolation and composition based isolation may be combined as follows: the output of the object model based isolation and composition based isolation comprises two matching sets of real and fakes for every proposed setup. Thus, every proposed setup has a multiple of isolation proposals—one based on the object model and one or more based on the composition. Each such combination of setup and a particular isolation proposal, together with the relevant heuristic retrieved on step 112, may define a suggested test.

On test choosing substep 212, a subset of combinations is chosen from the suggested combinations, in order to avoid duplications and select relevant combinations, upon which test will be generated using the heuristic retrieved on step 112 and validated on step 116. In order to choose the best combinations, the combinations are ordered based on the setup length and the number of fakes. The sorting is a dictionary sort, were the setup length is a primary key and the number of fakes is a secondary key.

A multiplicity of schemes can be suggested in order to choose the best tests. The following description list three such methods, but it will be appreciated that additional ones can be suggested and selected from.

A first scheme: all possible tests are generated upon the suggested combinations and the relevant heuristic. The tests may then be validated, and invalid tests may be removed. Then, out of the valid tests, the equivalent tests having the shortest setup and the lowest number of fakes are kept. Equivalent tests are tests having the same setup length and the same number of fakes.

A second scheme: according to the dictionary order determined, on each iteration one test is generated, and then validated. If found valid, all equivalent tests are found, validated as well, and the valid ones are kept.

A third scheme: groups of equivalent tests are generated and ordered in a defined order. If one or more of the tests in the group is tested and validated, all valid tests in the group are kept, otherwise execution continues with the next group according to the defined order.

On substep 216, code statements that call a specific method M in accordance with the retrieved heuristic are generated. This step may be performed in the same manner for all heuristics, for example it may be performed as follows:

If M is a static method: code is generated which calls M on the enclosing type, using the setup as prepared on substep 200, and storing the result into a variable.

If M is an instance method, then a new instance of the enclosing type has to be created. The instantiation of the object being tested is scanned for in the shadow call stack, and code is generated for calling the class constructor that was used to create the object being tested, passing to the constructor the argument values received in the call stack for the instance executing method M, using the algorithm detailed in association with substep 200 above. Then, similarly to what is done for a static method, code is generated which calls M on the enclosing type using the arguments prepared on substep 200 and storing the result into a parameter.

On substep 220, code statements that assert the correctness of the test function call are generated. This step generates the code that will examine, when the test is executed, whether the test has passed or failed. The implementation of step 220 may vary in accordance with the specific heuristic.

For the heuristic that relates to a primitive return value method, code is prepared which asserts that the actual result received from calling M is the same as the result observed in the shadow call stack.

For the heuristic that relates to a non-primitive return value method, further interactions with the object, after M has returned, are tested. Thus, code is prepared which: finds the ID of the object returned by M; using the ID, iterates over all further interactions with the object after M has returned, which return a primitive value, until a mutator method call on the returned object is found, and asserts that the returned primitive value is the same as the result observed in the shadow call stack.

For the heuristic that relates to an object under test state, further calls to other functions of the same object are tested. Thus, code is prepared which: given the ID of the object under test, iterates over all further interactions with the object after the call stack frame being tested, which return a primitive value, until a mutator method called on the object under test is found, and asserts that the returned primitive value is the same as the result observed in the shadow call stack.

For the heuristic that relates to an argument interaction test generation, further calls to other functions that receive any of M's non-primitive arguments are checked. Thus, code is prepared which: finds the last interaction with any of the non-primitive arguments received by M. It is then asserted that such interaction exists. The interaction is not required to return a primitive type, since only the call to such interaction is verified and no instance of the return type is required.

The tests may also be isolated, wherein isolation refers to separating the test code from any external dependencies it may have, with the goal of testing only the desired algorithm or behavior. For example, if a function or method m1 calls another function or method m2, wherein m2 is part of an external dependency, such as database access, hardware, operating system, or the like, then when testing m1 in isolation m2 is faked and its behavior is controlled to support the algorithm path being tested.

In addition, the tests may also be separated, wherein separation refers to separating code areas that are not tightly related to each other. For example, if a function or method m1 calls another function or method m2, and m2 is not called from any other location, for example if m2 is part of m1's implementation, be it a member of the same class, or a method on a class lower down in the same object model, there is no point in separating the testing of m1 and m2 as they belong to the same logical unit.

In some embodiments, the following algorithm may be used for determining test separation: first, the arguments to the method under test are prepared: every non-primitive argument is faked, i.e., an artificial argument is constructed, and the values received from methods for this argument in runtime are used as return values of stub functions. Thus, any method call done during testing for any non-primitive argument will return the same value as it returned during the test generation stage.

Object model determining: Let x be object under test, and let d be a dependency between m1 and m2. A directed graph is generated from a class or type A to any other class or type B if A references B. The graph is then reversed, so it is possible to determine for each class or type, the classes or types that reference it. P is defined as all the simple paths (paths without cycles) starting from d and going to all user code types in the system. If each path in P contains x, then all calls from m1 to m2 originate from the current object under test, and d should not be broken, i.e., m2 should not be separated from m1, otherwise, d should be isolated and m2 should be separated from m1. In alternative embodiments, P' is defined as all the paths in P not containing x. If each path in P' is a prefix of some path from P\P' (the difference between P and P'), then x should not be isolated from d. Otherwise, x needs to be isolated from d.

For implementation reasons, the algorithm may be executed separately for static dependencies between m1 and m2, and instantiated dependencies, wherein static dependencies relate to m2 being a static method of an object, and instantiated dependencies relate to m1 calling a method m2 of an objects that was constructed within m1.

In other embodiments, a different algorithm may be applied for separating function calls.

If the number of faked objects that may be created is limited, then faked objects may be created in the following cases:

First, if the examined code calls a function or method of an object that was passed as an interface rather than as an object of a concrete class, it may indicate that the developer chose to introduce some level of separation or abstraction between the examined code and the object, therefore the function or method of the interface will be faked. Faking the method may be done whether it was received as a parameter, set as a property or created by another dependency (for example received from a "factory").

If the object was received as an actual object and not as an interface, then if its constructor is "complex", it will be faked. A constructor may be defined as "complex" if it receives at least a predetermined number of objects that need to be created, or if creating one of the parameters requires at least a predetermined number of constructors. For example, if a constructor requires the activation of at least five other constructors, whether serially or from within one another, the constructor may be faked.

If an object is not faked, but its constructor fails during validation step 122 described above, its constructor may be replaced by a faked constructor.

In other cases real methods or functions may be used, wherein some of the called functions may be faked. In particular, situations which create side effects are handled. For a sequence of function calls on an object before it is acted upon, (also called setup) the system will identify the minimal setup that can be used in a test. This is done by attempting to test the object by calling only the last call in the setup, and if that fails adding more calls repeatedly until the test passes. Once the test passes the system called only the setup calls that were required to pass the test, thus achieving minimal setup.

Figure 3:
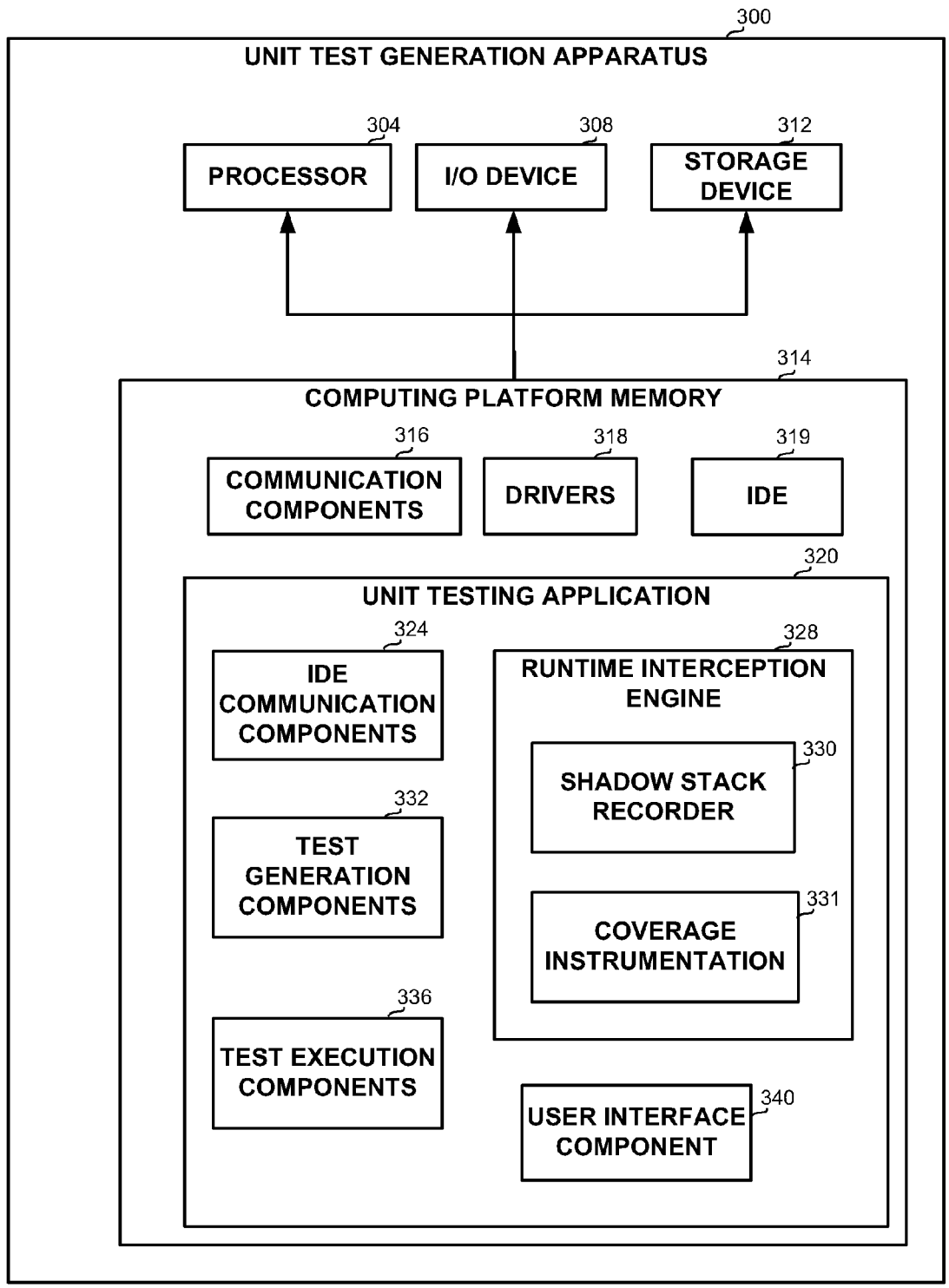
FIG. 3 shows a block diagram of components of an apparatus for unit testing, in accordance with some exemplary embodiments of the disclosed subject matter.

Referring now to FIG. 3, showing a block diagram of components of an apparatus for unit testing, in accordance with some exemplary embodiments of the disclosed subject matter.

The environment comprises a system with a unit test generation apparatus 300, which is operative in generating and executing unit testing. This apparatus may be specially constructed for the desired purposes, or it may comprise a general purpose computer selectively activated or reconfigured by a computer program stored in the computer.

In some exemplary embodiments, apparatus 300 may comprise a processor 304. Processor 304 may be a Central Processing Unit (CPU), a microprocessor, an electronic circuit, an Integrated Circuit (IC) or the like. Alternatively, apparatus 300 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processor 304 may be utilized to perform computations required by the methods of FIG. 1A, FIG. 1B or FIG. 2, or any of their steps.

In some exemplary embodiments of the disclosed subject matter, apparatus 300 may comprise an Input/Output (I/O) device 308 such as a terminal, a display, a keyboard, an input device or the like, to interact with the system, to invoke the system and to receive results. It will however be appreciated that the system can operate without human operation.

In some exemplary embodiments, apparatus 300 may comprise or be associated with one or more storage devices such as storage device 312 for storing the unit testing computer program, or any other computer program and/or data. The storage device may be volatile, non-transitory or persistent, and may include any computer readable storage medium, such as, but not limited to, any type of disk including one or more floppy disks, optical disks such as CD-ROMs, DVDs, laser disks, a magnetic storage device such as a tape, a hard disk, storage area network (SAN), a network attached storage (NAS), or others; a semiconductor storage device such as Flash device, memory stick, or the like. In some embodiments storage device 312 can be read-only memories (ROMs), random access memories (RAMs), electrically programmable read-only memories (EPROMs), electrically erasable and programmable read only memories (EEPROMs), or any other type of media suitable for storing electronic instructions, and capable of being coupled to a computer system bus.

Figure 2:
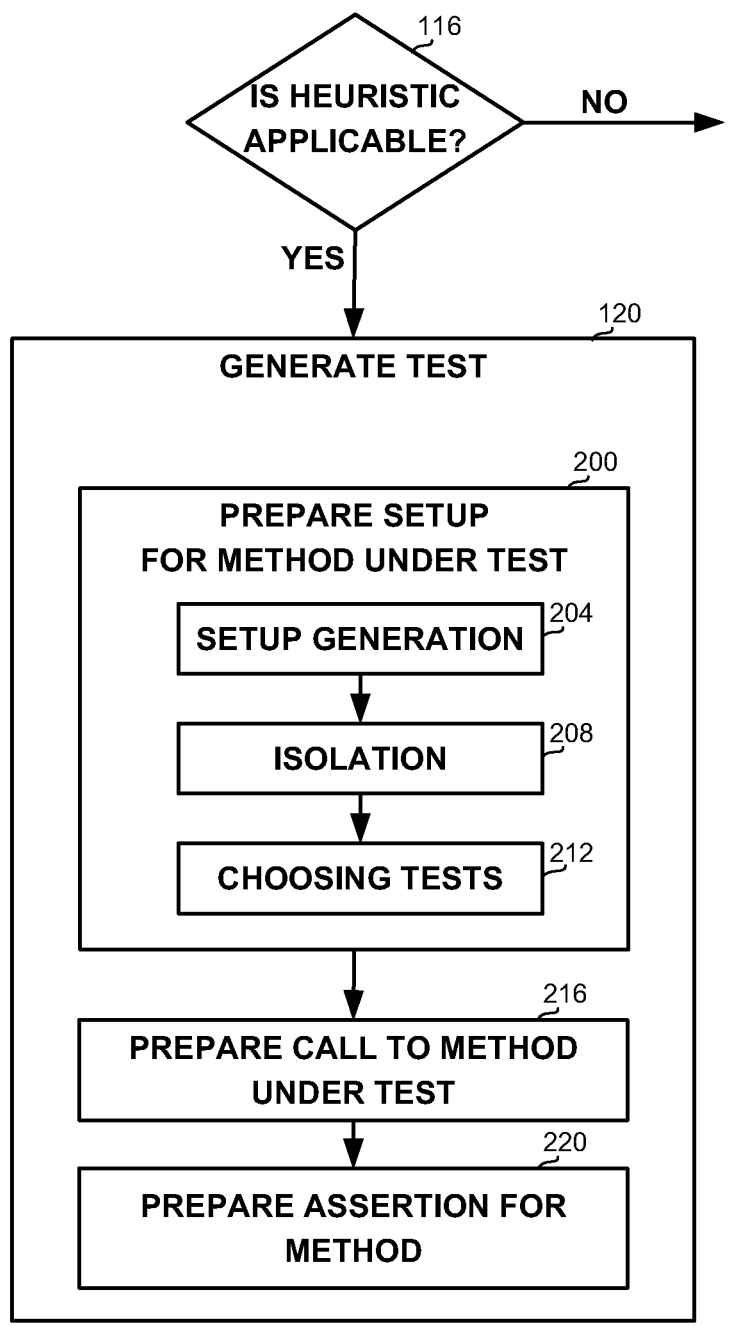
FIG. 2 shows a flowchart diagram of steps in a method for generating a test associated with a particular entry in a call stack, in accordance with some exemplary embodiments of the disclosed subject matter.

In some exemplary embodiments, storage device 312 may retain data and program code operative to cause processor 304 to perform acts associated with any of the steps shown in FIG. 1A, FIG. 1B, or FIG. 2, above, for example generating tests, executing tests, displaying results or the like.

The apparatus may further comprise computing platform memory device 314 for retaining loaded computer instructions to be executed for example by processor 304, by another processor or any combination thereof, in association with unit testing. The instructions may be arranged as one or more executable files, dynamic libraries, static libraries, methods, functions, services, or the like, programmed in any programming language and under any computing environment. In some embodiments, the instructions may be arranged in multiple executables or modules, wherein some modules may be used when generating tests while others may be used when executing the tests. However, one or more such components can be used both when generating the tests and when executing the tests.

In some embodiments, memory device 314 may retain communication components 316 which may be used for communicating with other entities, such as I/O devices, databases, or the like.

Memory 314 may further comprise instructions associated with one or more drivers 318, such as database drivers, peripheral devices drivers, network drivers, storage drivers, or the like.

In some embodiments, one or more instructions for executing an Integrated Development Environment (IDE) 319 may be loaded to memory 314, using which a user may develop code to be tested.

The apparatus further comprises unit testing application 320, adapted to generate tests upon user actions, execute the tests as changes are introduced to the user's code, and output results. Unit testing application 320 can be implemented as an addin for IDE 319 or in any other manner.

Unit testing application 320 comprises IDE communication component 324 for communicating between the application and the IDE, thus providing unit testing capabilities in the form of an addin to an IDE used for developing user code, and enabling the unit testing application to be executed as an addin to the IDE. IDE communication component 324 provides the option to operate the system within the development environment, including analysis of the user's actions, test generation, test management and execution, coverage information display, debugging failed tests, or the like.

IDE communication component 324 may thus be adapted to incorporate testing code into the application being developed, to detect changes that require automated tests to be executed, register to compiler events and trigger test execution upon a successful build, hook into the development environment's debugger, programmatically initiate debugging sessions for failed tests, or the like.

Unit testing application 320 further comprises runtime interception engine 328, which provide for intercepting user interactions when testing a function implemented by the user code, or recording data during the execution. In a .Net development environment, a CLR profiler may be used for analyzing and interacting with the profiled process. This can be done, for example, by IL code weaving, as described in PCT Patent Application No. IL2007/001152 titled "Method and system for isolating software components", incorporated herein by reference in its entirety. Another technique for analyzing and interacting with the profiled process is shadow stack, described for example in "Enter, Leave, Tail call Hooks Part 1: The Basics" by David Broman published on David Brotman's CLR Profiling API Blog on MSDN blogs on Mar. 22, 2007, or in "Call Stacks in the Profiling API" published on MSDN and available at msdn.microsoft.com/en-us/library/bb384634(v=vs.90).aspx, both incorporated herein by reference in their entirety.

In order to inspect the interaction of the developer with the application during manual testing, runtime interception component 328 intercepts function calls made in runtime by implementing an interceptor, and registering to receive notifications for entry or exit of any function. This can be done, for example, by using a CLR Profiler in the .Net environment and registering to receive MethodEnter or MethodLeave notifications or using Java's JVMTI interface and registering to receive MethodEntry or MethodExit notifications. Information received by these notifications is then used by shadow stack recorder 330 for creating one or more shadow call stacks, i.e., data structures representing the actual call stack as occurred during execution. In some embodiments, for efficiency sake, the shadow call stack which is used for test generation and for coverage analysis may log only calls to functions that require test generation. The profiler implementation may filter out, for example, any function calls between $3^{rd}$ party components, as these are not part of the user's code and should not be tested. The following data may be logged regarding each function, for test generation purposes: function name; function signature, including return type and argument types, arguments values; actual return value; generic arguments, whether classes or methods, reflection metadata such as visibility or accessibility, modifiers (such as static, virtual, etc.); whether the method belongs to the user code or to $3^{rd}$ party code, or any other information. The data may be serialized, for example into an XML string and sent over a named pipe to test generation component 332 detailed below, for analysis and test generation.

Runtime interception engine 328 optionally comprises coverage instrumentation component 331 for monitoring the code coverage and intercepting code segments that were tested during a unit test execution. Coverage instrumentation component 331 may use the code weaving technique discussed above may be used. Using code weaving, additional code that raises a Boolean flag is inserted into every code block, i.e., a contiguous execution segment of the user's code in the application under test. Using debug information, the code block and flag can be tied to a location in the source code file. During test execution, the Boolean flags relating to the covered code blocks are trapped, and when test execution is completed the different flags are analyzed and coverage information is generated. The coverage information may be displayed textually, graphically, over the user's code using a color scheme, or in any other manner.

Yet another component of unit testing application 320 may be test generation component 332, which is operative in generating tests upon the shadow call stack captured by runtime interception component 328. The test generation may use one or more heuristic and create for each tested function or method, one or more tests in accordance with the applicable heuristics as described in association with step 108 of FIG. 1A above.

Yet another component of unit testing application 320 may be test execution component 336, which is operative in deciding which tests to run and executing those tests. Test execution component 336 may comprise a test selection component for selecting the actual tests to be performed, and a runtime test execution component for executing these tests.

The test selection component may use optimization for determining a minimal set of unit tests, according the changes performed by the user to the code, thus providing the required coverage while reducing the used resources. The optimization can be done by crossing information about changes performed by the user, with past coverage data. Thus, the tests to be performed may include all tests that generated past coverage information for any block that has been changed.

The runtime test execution component may execute tests in accordance with the following algorithm: all test functions in the test code are scanned. If the test functions are implemented as methods of objects, then the tests may be traversed according to the objects they belong to. In addition, each such object or function may comprise additional functions which are not test functions but rather auxiliary functions. The auxiliary functions are not called.

Each test function is compared against the list of tests as generated by the test selection component. If the test appears in the list, then it is executed. If an error is returned by the test, or an exception is raised, the error is logged, and a fail result is returned. The test function list may be compared against the selected tests using a string comparison of the test names generated as described for example in association with step 104 of FIG. 1 above.

Unit testing application 320 may also comprise a user interface component 340 for displaying to a user various aspects of the method and apparatus, such as the coverage of the code by the existing tests, the results of the last unit test execution, a saved execution, or the like, and for receiving data from the user for example specific commands or parameters related to the unit testing application. User interface component 340 may be implemented as part of an MMI component of IDE 319, or separately.

The disclosure provides a method and apparatus for unit testing during software development. The method and apparatus enable a user to effectively test his code and ensure a regression safety net that will automatically be executed for the code when required.

The method and apparatus may be integrated into the IDE, thus enabling users to continuously test their code without having to leave the IDE, perform dedicated tests, to write testing code, or to integrate such code into the environment.

The method and apparatus use the manual tests as performed, even once, by the user as part of the code development, for automatically generating testing code which tests the actual functionality of the code in the method or function level, and not as a black box.

The method and apparatus automatically isolate the user's code from external dependencies, so that only the user's code is tested.

The method and apparatus automatically execute the testing code when the user's code has changed in a manner that may change the result of such tests, and notify the user if one or more tests have failed. When a test has failed, the method and apparatus may provide information regarding the expected result or side effect vs. the actual result or side effect, and may enable the user to recreate the failing scenario without having to execute the manual test again.

The user may also receive feedback and be presented with the coverage of the generated test set, which may indicate areas that are not tested by the existing test set, whether it is the initial test set which insufficiently covers the code, or due to changes or additions to the code which introduced code that has not been tested. The coverage may be displayed textually, graphically, over the user's code, or in any other manner.

Thus, using the method and apparatus, the user may gain the benefits of automated unit testing, without changing their working routines.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method for unit testing of code under test performed by a computerized device, said method comprising:
    identifying a first function, of the code under test, being manually tested by the user;
    intercepting code interactions of the first function with a second function and generating a shadow call stack of an execution of the first function;
    recording execution objects, including arguments and return values, passed between the first and second functions during the execution of the first function and
    automatically generating, from the intercepted code interactions and recorded execution objects, a new unit test for testing a unit of the code under test including the first function, the unit test being comprised of code statements including:
        (1) a call to the first function;
        (2) an assertion for the first function result or side effect; and
        (3) one or more code statements designed to recreate a unit state at a time the first function was called during said intercepting of code interactions of the first function,
    wherein generating the one or more code statements designed to recreate a unit state at a time the first function was called comprises:
        i. analyzing the shadow call stack to identify frames which use one or more variables of a unit state of the code under test;
        ii. for each given identified frame, identifying mutating frames preceding the given frame containing methods mutating the one or more variables; and
        iii. adding the identified mutating methods to a setup of the new unit test.

2. The computer-implemented method of claim 1, wherein the execution objects comprises one or more call stacks recorded during the execution of the second function.

3. The computer-implemented method of claim 1, further comprising:
    detecting a code change in the first function; and
    automatically executing the new unit test to test the code as changed.

4. The computer-implemented method of claim 1, further comprising:
    starting a debug session;
    executing at least one test function within the debug session; and
    stopping execution at the first function.

5. The computer-implemented method of claim 1, wherein the new unit test is generated in accordance with at least one heuristic applicable for the first function and the at least one heuristic is selected from the group consisting of: the first function returns a primitive type; the first function has a return value of a non-primitive type and the return value is later used by a function that returns a primitive value; the first function under test is a member of an object for which another method which returns a primitive value, is called; and a non-primitive argument to the first function is interacted from within the first function.

6. The computer-implemented method of claim 5, wherein at least two heuristics are checked for applicability at a descending priority order, and the new unit test is generated in accordance with a first applicable heuristic.

7. The computer-implemented method of claim 1, wherein generating code for the new unit test comprises isolating testing of a function called from within the first function.

8. The computer-implemented method of claim 1, wherein generating code for the new unit test comprises validating that the new unit test passes for the first function as created.

9. The computer-implemented method of claim 1, further comprising selecting a new unit test function for execution from a multiplicity of tests.

10. An apparatus for unit testing of code under test, said apparatus comprising:
    an integrated development environment (IDE) communication component, comprising processing circuitry configured to provide unit testing capabilities as an addin to an IDE used for developing user code;
    a runtime interception component, comprising processing circuitry configured to: (a) identify a first function, of the code under test, being manually tested by the user; (b) intercept code interactions of the first function with a second function; (c) generate a shadow call stack of an execution of the first function, and (d) record execution objects, including arguments and return values, passed between the first and second functions during the execution of the first function; and
    a test generation component, comprising processing circuitry configured to automatically generate, from the intercepted code interactions and recorded execution objects, a new unit test for testing a unit of the code under test including the first function, the unit test being comprised of code statements including:
        (1) a call to the first function;
        (2) an assertion for the first function result or side effect; and
        (3) one or more code statements designed to recreate a unit state at a time the first function was called during said intercepting of code interactions of the first function wherein generating the one or more code statements designed to recreate a unit state at a time the first function was called comprises:

i. analyzing the shadow call stack to identify frames which use one or more variables of a unit state of the code under test;
 ii. for each given identified frame, identifying mutating frames preceding the given frame containing methods mutating the one or more variables; and
 iii. adding the identified mutating methods to a setup of the new unit test.

11. The apparatus of claim 10, wherein the execution data comprises one or more call stacks recorded during execution of the second function.

12. The apparatus of claim 10, wherein the new unit test is generated in accordance with at least one heuristic applicable for the second function and the at least one heuristic is selected from the group consisting of: the second function returns a primitive type; the second function has a return value of a non-primitive type and the return value is later used by a function that returns a primitive value; the first function under test is a member of an object for which another method which returns a primitive value, is called; and a non-primitive argument to the first function is interacted from within the first function.

13. The apparatus of claim 10, further comprising a user interface configured to display data to a user and receive information from a user.

14. A computer program product for generating unit testing for a code under test, said product comprising:
 a non-transitory computer readable medium;
 a first program instruction for identifying a first function, of the code under test, being manually tested by the user, intercepting code interactions of the first function with a second function and generating a shadow call stack of the execution of the first function;
 a second program instruction for recording execution objects, including arguments and return values, passed between the first and second functions during the execution of the first function; and
 a third program instruction for automatically generating, from the intercepted code interactions and recorded execution objects, a new unit test for testing a unit of the code under test including the first function, the unit test being comprised of code statements including:
 (1) a call to the first function;
 (2) an assertion for the first function result or side effect; and
 (3) one or more code statements designed to recreate a unit state at a time the first function was called during said intercepting of code interactions of the first function;
 wherein generating the one or more code statements designed to recreate a unit state at a time the first function was called comprises:
  i. analyzing the shadow call stack to identify frames which use one or more variables of a unit state of the code under test;
  ii. for each given identified frame, identifying mutating frames preceding the given frame containing methods mutating the one or more variables; and
  iii. adding the identified mutating methods to a setup of the new unit test and wherein said first, second and third program instructions are stored on said non-transitory computer readable medium.

* * * * *